Dec. 16, 1924.  
F. M. FURBER  
GRINDING APPARATUS  
Filed Dec. 14, 1918  
1,519,124

INVENTOR  
Frederick W. Furber  
By his Attorney  
Nelson W. Howard

Patented Dec. 16, 1924.

1,519,124

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

GRINDING APPARATUS.

Application filed December 14, 1918. Serial No. 266,771.

*To all whom it may concern:*

Be it known that I, FREDERICK M. FURBER, a citizen of the United States, residing at Revere, in the county of Suffolk and State of Massachusetts, have invented certain Improvements in Grinding Apparatus, of which the following description, in connection with the accompanying drawings, is a specification, like reference characters on the drawings indicating like parts in the several figures.

This invention relates to grinding apparatus and particularly to that adapted for sharpening toothed cutters, such as are employed for trimming the edges of shoe soles.

Although machines more or less automatic in character have been devised for the grinding of edge trimming cutters, they have not been entirely successful, due, at least in part, to the fact that the operators of edge trimming machines usually prefer to grind their own cutters and have long been accustomed to employ for this purpose a relatively simple apparatus. In this, a spindle is mounted upon an arm in proximity to an abrasive wheel, the spindle passing through the opening in a cutter and guiding it in a movement of translation to permit the forward face of any tooth to be passed over the grinding surface of the wheel, and also allowing the cutter to be rotated on the spindle to bring successive teeth into co-operation with said surface. The use of such an apparatus is, however, open to several objections. The operator in moving the cutter along the spindle is liable to first bring the corner of a tooth against the wheel, after which the travel of the cutter presents the remainder of the face of the tooth to the wheel. This leads to the reduced portion of the tooth being longest in contact with the grinding surface, causing it to become overheated and its temper drawn. Another difficulty lies in the fact that the grinding pressure applied to the cutter is entirely a matter of judgment on the part of the operator, and may lack in uniformity, some of the teeth being forced too hard against the wheel and consequently over-ground and burned.

An object of my invention is to provide an improved grinding apparatus of the general character of that with which operators are familiar by which all points in the entire face of a tooth to be ground are simultaneously brought into co-operation with the grinding surface. For this purpose, a cutter-supporting member is movable over a guiding member to bring a cutter carried by the supporting member into contact with the grinding surface. In the illustrated construction these members have a co-operating slot and projection, one of which is extended in the direction of cutter movement, this extended element being provided with a portion parallel to the direction of movement to guide the cutter in a constant relation to the grinding surface, and a portion to guide the cutter clear of said surface. The extended element may be furnished by a slot in a cutter-supporting sleeve engaged by a projection upon a guiding spindle, said slot having separated straight portions extending in the direction of movement, and a connecting inclined portion.

Another object of the invention is to arrange for the application of a predetermined maximum pressure of the cutter upon the surface of the wheel during grinding. To this end, the grinding wheel and cutter-supporting member are relatively yieldable. Preferably, the shaft of the grinding wheel has an enlargement, and surrounding the shaft and being interposed between the enlargement and the frame of the apparatus is a spring which permits the yield of the wheel as the cutter is pressed against it by the action of the previously mentioned projection and slot.

Other objects of the invention have to do with the general improvement of the efficiency and convenience of cutter grinding apparatus.

In the accompanying drawing illustrating a particular embodiment of the invention, Figure 1 is a top plan view of my improved grinding apparatus, parts being broken away;

Figures 1, 2, 3:
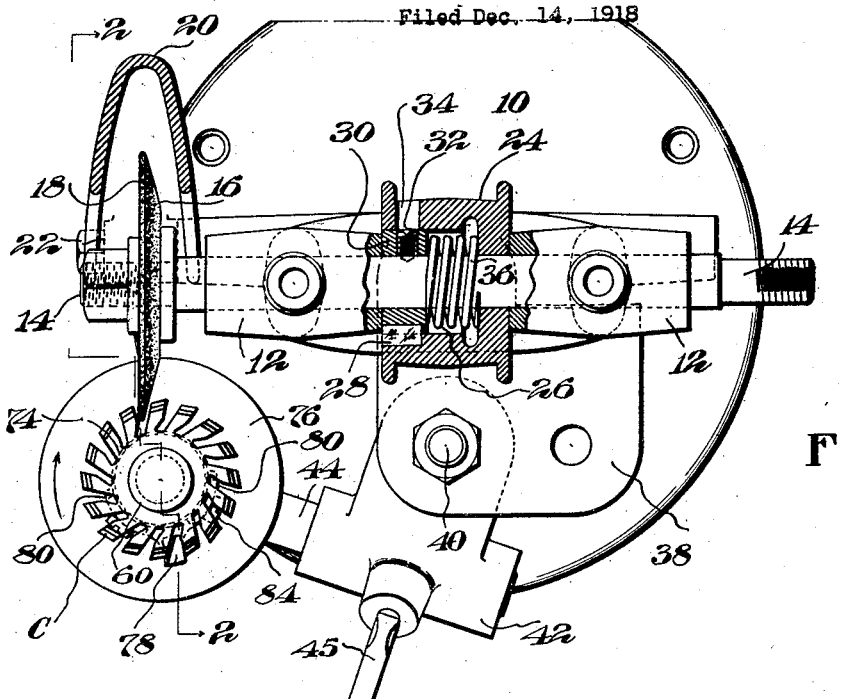
Fig. 2 is a vertical section on the line 2—2 of Fig. 1.
Fig. 3 is a detail in front elevation, showing the guiding device for the cutter support.

At the top of a frame standard 10 are separated bearings 12, 12 for a horizontal shaft 14, at one extremity of which is fixed a grinding wheel 16 of suitable abrasive material. The edge of this wheel is so formed as to enter between the teeth of the cutters to be ground and has at one face a vertical grinding surface 18. The wheel is shown as protected by a guard 20 partly encircling it and secured at 22 to the frame of the machine. Carried by the shaft between the bearings is a pulley 24, recessed at one side at 26 and connected at the outer end of the recessed portion by a spline 28 to a groove in the periphery of an enlargement 30 upon the shaft. This enlargement is preferably in the form of a collar secured by a set screw 32 to the shaft, the set screw being accessible through an opening 34 in the pulley. The spline and groove connection between the pulley and shaft allows the latter to be moved longitudinally in its bearings through the former, while compelling its rotation by power applied to the pulley by means of a belt. Surrounding the shaft within the pulley recess is a helical spring 36 having one extremity abutting against the end wall of the recess and the other end contacting with the inner face of the collar 30. This spring holds the shaft and grinding wheel in a normal position at the left, as viewed in Fig. 1, the contact of the collar with the adjacent bearing limiting movement in this direction, and permits the shaft and grinding wheel to yield toward the right by virtue of the compression of the spring.

Upon a lug 38 extending horizontally from the standard is pivoted at 40 a bracket 42 provided with a horizontal opening through which passes an arm 44 secured in place by a set screw 45, so that its projection from the arm may be varied. At the end of the arm opposite the bracket 42 is an enlargement 46, in which is a vertical opening, the outer wall of said opening being divided at 48. The sides of the enlargement may be drawn together by a screw 50 passing through one of a pair of lugs 52 and being threaded into the other. By means of this screw, the enlargement walls may be caused to adjustably clamp a vertical spindle 54 situated adjacent to the grinding wheel. The upper extremity of this spindle is recessed at 56, and in this is seated a spring 58 contacting with the closed upper end of a sleeve 60 fitting the exterior of the spindle and being movable vertically over and rotatable thereon. The upper portion of the sleeve is reduced in diameter to form a shoulder 62 for the support of the cutters to be ground, one of which is shown in the drawing at C. From the spindle below the plane of the grinding wheel projects the head portion of a screw 64 surrounded by an anti-friction roll 66, this roll lying within and contacting with the side walls of a vertical slot in the sleeve. This slot has lower and upper portions 68 and 70, respectively, preferably parallel to the axis of the spindle or to the direction of movement of the sleeve thereon, and an intermediate inclined connecting portion 72. It will be seen, that if the sleeve is moved downwardly against the tension of the spring 58, it is first guided in a vertical direction by the portion 68 of the slot, and is then rotated by the incline 72 to another angular position, in which it is guided for further vertical movement by the upper slot portion 70. To guard the bearing surfaces between the spindle and sleeve against wear, a cylindrical shield 74, which may be of sheet metal, surrounds the sleeve, covering the slot therein, while an annular shield or skirt 76 is shown as fixed outside the shield 74 upon the main sleeve 60, extending between the grinding wheel and the lower portion of the spindle and directing the abrasive particles away from the latter. Extending parallel to the sleeve 60 above the shoulder 62 is a stop or finger 78, arranged to project between the teeth of the cutter being operated upon and hold a tooth of said cutter in the correct grinding relation to the surface 18 of the wheel. Raising the cutter from the shoulder and sliding it vertically upward along the sleeve enables the operator to free it from the finger to turn the cutter so that another tooth may be brought into co-operation with the wheel, the cutter then being lowered to bring the finger again into engagement with the teeth. The finger is secured upon the sleeve 60 by means here shown as lateral extensions 80 from its lower end, in which extensions are horizontal slots 82 to receive screws 84 threaded into the sleeve. By this arrangement the finger may be varied in its angular relation to the sleeve to change the vertical plane in which the face of the cutter to be ground is presented to the wheel. Below the sleeve is a screw 86 threaded through the enlargement 46 of the supporting arm, the opening for the screw preferably being on opposite sides of the division 48 of the enlargement. The upper extremity of the screw lies beneath the lower end of the sleeve 60 and serves as a stop to limit its downward travel and the distance which the cutter is moved across the surface 18 of the wheel. By rotating this screw to raise or lower its contact end, the length of travel of the sleeve and cutter may be adjusted. When the screw 50 is set, it will be seen that it not only clamps the spindle 54 in position in the arm, but also fixes the screw 86 against accidental movement.

In using the apparatus, the operator applies the cutter to be ground to the reduced portion of the sleeve, its hub resting upon the shoulder 62 and it being held against rotation upon the sleeve by the engagement of the finger 78 with its teeth. By changing the angle of the bracket 42 upon the frame and the projection of the arm 44 from the bracket, the angle at which the grinding surface 18 will act on the forward face of the teeth will be determined. The normal vertical position of the cutter, which is preferably just out of contact with the wheel, depends upon the adjustment of the spindle 54 through the arm and the extreme of downward movement of the cutter depends upon the position of the screw 86. The operator, now grasping the cutter and turning it in a clockwise direction until the forward face of a tooth contacts with the finger 78, presses down the sleeve against the spring 58. As the portion 68 of the slot travels along the roll 66, the cutter is moved in a path parallel to the direction of travel and out of contact with the grinding surface 18 until the entire face to be ground is opposite the grinding surface. At this time the inclined portion 72 of the slot is reached, which rotates the sleeve and cutter to bring the tooth-face into grinding contact with the wheel. This is maintained through the remainder of the downward travel, while the portion 70 of the slot passes over the roll. It will be obvious that the finger 78 limits the amount that the cutter can be turned upon its spindle at this time, this rotary movement being relatively slight, and that the entire movement of the tooth-face toward the grinding surface is limited to the amount of this movement and that produced by the portion 72 of the guiding slot. By the setting of the finger 78, this can be made sufficient to allow the necessary amount of material to be removed from the tooth to properly sharpen it. The pressure exerted against the wheel cannot exceed a definite maximum dependent upon the tension of the spring 36, since when this is exceeded the grinding wheel will be moved with the cutter as the spring is compressed. The character of the spring and the extent of angular movement of the cutter produced by the slot portion 72 is such as to prevent undue pressure being exerted. As the cutters are ground away in sharpening, or if those of different diameters are to be operated upon, this may be provided for in the adjustment of the pivot 40 of the bracket 42, the extension of the rod 44 and the adjustment of the finger 78.

Having described my invention, what I claim as new and desire to secure by Letters Patent of the United States is:

1. In a grinding apparatus, a grinding wheel, a guiding member, and a cutter-supporting member movable thereover adjacent to the grinding wheel, the members being provided with a co-operating slot and projection one of which extends in the direction of movement, the extended element having a portion parallel to the direction of movement to guide a cutter carried by the supporting member in a constant relation to and in contact with the grinding surface and a portion to guide the cutter clear of the grinding surface.

2. In a grinding apparatus, a grinding wheel, a guiding member, and a cutter-supporting member movable thereover adjacent to the grinding wheel, the members being provided with a co-operating slot and projection one of which extends in the direction of movement, the extended element having a portion parallel to the direction of movement to guide a cutter fixed in position on the supporting member in a constant relation to the grinding surface and a portion to guide the cutter clear of the grinding surface, the extended element being arranged to bring the cutter and grinding surfaces into contact only when substantially the entire surface to be ground is opposite the grinding surface.

3. In a grinding apparatus, a grinding wheel, a spindle and sleeve mounted adjacent thereto, said spindle and said sleeve being relatively movable, the movable member being arranged to support a cutter for grinding, and a mounting for the grinding wheel constructed and arranged to allow the wheel to yield under predetermined pressure of contact with the cutter.

4. In a grinding apparatus, a grinding wheel, a guiding member, a cutter-supporting member movable thereover adjacent to the grinding wheel, and yieldable connections for predetermining the maximum pressure of contact between the grinding wheel and the work carried by the cutter supporting member, the members being provided with a co-operating slot and projection one of which extends in the direction of movement, the extended element having a portion parallel to the direction of movement to guide a cutter carried by the supporting member in a constant relation to the grinding surface and a portion guiding the cutter clear of the grinding surface.

5. In a grinding apparatus, a grinding wheel, a guiding member, and a cutter-supporting member movable thereover adjacent to the grinding wheel, the members being provided with a co-operating slot and projection arranged to guide a cutter carried by the movable member into and out of contact with the grinding surface, said movable member having a finger arranged to enter between the cutter teeth.

6. In a grinding apparatus, a grinding wheel, a guiding member, a cutter-supporting member movable thereover adjacent to the grinding wheel, said movable member carrying a finger arranged to enter between the cutter teeth, and means permitting the position of the finger upon the movable member to be varied.

7. In a grinding apparatus, a grinding wheel, a spindle and sleeve mounted adjacent thereto, the movable member being arranged to support a cutter to be ground, and a stop movable to variably limit the travel of the cutter, said spindle and said sleeve being relatively movable by engagement with the sleeve.

8. In a grinding apparatus, a grinding wheel, a relatively movable spindle and sleeve mounted adjacent thereto and being provided with a co-operating slot and projection one of which extends in the direction of movement, the extended element having a portion parallel to the direction of movement to guide a cutter carried by the movable member in a constant relation to the grinding surface and a portion guiding the cutter clear of the grinding surface, and a stop movable to variably limit the travel of the movable member while the projection is in the parallel portion of the slot.

9. In a grinding apparatus, a grinding wheel, a relatively movable spindle and sleeve mounted for relative movement in contact with one another, the movable member being arranged to support a cutter to be ground, and a guard extending over and protecting the contacting surfaces.

10. In a grinding apparatus, a grinding wheel, a relatively movable spindle and sleeve mounted adjacent thereto, the movable member being arranged to support a cutter to be ground, and a skirt carried by the lower extremity of the movable member and extending between the contacting surfaces of the members and the grinding wheel.

11. In a grinding apparatus, a grinding wheel, a spindle mounted adjacent thereto, a cutter-supporting sleeve movable on the spindle, the spindle and sleeve being provided with a co-operating slot and projection, and a guard sleeve surrounding the cutter-supporting sleeve and extending over the slot.

12. In a grinding apparatus, the combination with a grinding wheel, of a spindle mounted adjacent to the grinding wheel, and a cutter-supporting sleeve movable on the spindle, the spindle and sleeve being provided with a co-operating slot and projection, the slot having a straight portion extending in the direction of movement of the sleeve and an inclined portion.

13. In a grinding apparatus, the combination with a grinding wheel, of a spindle mounted adjacent to the grinding wheel, and a cutter-supporting sleeve movable on the spindle, the spindle and sleeve being provided with a co-operating slot and projection, the slot having separated straight portions extending in the direction of movement of the sleeve and a connecting inclined portion.

14. In a grinding apparatus, the combination with a grinding wheel, of a spindle mounted adjacent to the grinding wheel, a cutter-supporting sleeve movable on the spindle, the sleeve being provided with a longitudinal slot, and an anti-friction roll rotatable upon the spindle and entering the slot.

15. In a grinding apparatus, a grinding wheel, a fixed spindle extending at right angles to the axis of the grinding wheel, a projection on the spindle, a cutter support slidably mounted upon the spindle and having a slot therein extending in the direction of movement of the cutter support for co-operating with said projection, the side of the slot having a portion parallel to the direction of said movement to guide a cutter carried by said support in a constant relation to and in contact with the surface of the grinding wheel and having another portion inclined to the direction of said movement to guide the cutter clear of said surface, and a spring for moving the cutter support in one direction.

16. In a grinding apparatus, the combination with a frame, a pulley held against axial movement in the frame, a shaft movable longitudinally of the pulley and arranged to be driven thereby, a grinding wheel secured to the shaft, a cutter support mounted adjacent to the grinding wheel, and a spring interposed between said pulley and an enlargement on the shaft to permit the grinding wheel to yield when a cutter is pressed against the grinding wheel with a pressure exceeding a predetermined amount.

17. In a grinding apparatus, the combination with a frame, a pulley contacting on one side with the frame and having at the other side a recess, a shaft slidable through the pulley and arranged to be driven thereby, a grinding wheel secured to the shaft, a cutter support mounted adjacent to the grinding wheel, and a spring surrounding the shaft within the recess and contacting with an enlargement on the shaft to permit the grinding wheel to yield when the cutter is pressed against it.

18. In a grinding apparatus, the combination with a grinding wheel, of a spindle mounted adjacent to the grinding wheel, a cutter-supporting sleeve movable on the spindle, and a cutter-engaging finger variable in its position circumferentially of the sleeve.

19. In a grinding apparatus, the combination with a grinding wheel, of a spindle mounted adjacent to the grinding wheel, a cutter-supporting sleeve movable on the spindle, a cutter-engaging finger provided with an angular extension in which is a slot, and a screw extending within the slot and being threaded into the sleeve.

20. In a grinding apparatus, the combination with a grinding wheel, of an arm extending in proximity thereto, a spindle carried by the arm, a cutter-supporting sleeve movable upon the spindle, and a screw threaded through the arm and with which the sleeve may contact to adjustably vary its movement.

21. In a grinding apparatus, the combination with a grinding wheel, of an arm extending in proximity thereto and being divided, means for drawing the portions of the arm together, a spindle and a screw fixed between the arm portions, and a cutter-supporting sleeve movable on the spindle and contacting with the screw.

22. In a grinding apparatus, a grinding wheel, a vertical spindle, a slotted sleeve movable upon the spindle and having means for supporting a cutter, a guard extending over the slot in the sleeve, and a guard fixed to the sleeve below the cutter and projecting between the grinding wheel and spindle.

23. In a grinding apparatus, an axially movable driven shaft, a grinding wheel secured to the shaft, a spring normally urging said shaft and wheel toward one limit of their axial movement, a spindle and sleeve mounted adjacent to said wheel for axial movement relatively to each other, the movable member being adapted to support a cutter for grinding, means for guiding said movable member to position said cutter in operative relation to said wheel and normally to maintain said relation, and a mounting for the grinding wheel constructed and arranged to allow the wheel to yield upon predetermined pressure of the cutter against the wheel.

In testimony whereof I have signed my name to this specification.

FREDERICK M. FURBER.

Certificate of Correction.

It is hereby certified that in Letters Patent No. 1,519,124, granted December 16, 1924, upon the application of Frederick M. Furber, of Revere, Massachusetts, for "Grinding Apparatus," an error appears in the printed specification requiring correction as follows: Page 3, line 128, claim 7, after the word "thereto," insert the words *said spindle and said sleeve being relatively movable*, and strike out the same in lines 1 and 2, same claim, page 4; and that the said Letters Patent should be read with this correction therein that the same may conform to the record of the case in the Patent Office.

Signed and sealed this 28th day of April, A. D. 1925.

[SEAL.] KARL FENNING,
*Acting Commissioner of Patents.*